US011525742B2

(12) United States Patent
Zhang et al.

(10) Patent No.: US 11,525,742 B2
(45) Date of Patent: Dec. 13, 2022

(54) TEMPERATURE SENSOR

(71) Applicant: GM GLOBAL TECHNOLOGY OPERATIONS LLC, Detroit, MI (US)

(72) Inventors: Alfred Zhang, Troy, MI (US); Gayatri V. Dadheech, Bloomfield Hills, MI (US); Jing Gao, Rochester, MI (US); Brian J. Koch, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 16/788,848

(22) Filed: Feb. 12, 2020

(65) Prior Publication Data

US 2021/0247242 A1 Aug. 12, 2021

(51) Int. Cl.
| | |
|---|---|
| *H01M 4/66* | (2006.01) |
| *H01M 10/48* | (2006.01) |
| *G01K 7/22* | (2006.01) |
| *G01K 13/00* | (2021.01) |
| *H01M 4/02* | (2006.01) |

(52) U.S. Cl.
CPC ............. *G01K 7/22* (2013.01); *G01K 13/00* (2013.01); *H01M 4/661* (2013.01); *H01M 10/486* (2013.01); *H01M 2004/021* (2013.01)

(58) Field of Classification Search
CPC ........ H01M 10/48; H01M 10/20; H01M 4/66; H01M 4/64; G01K 7/22; G01K 13/00
See application file for complete search history.

(56) References Cited

U.S. PATENT DOCUMENTS

| 5,255,981 A * | 10/1993 | Schiessle ................ G01K 5/52 |
| | | 374/176 |
| 2004/0169579 A1* | 9/2004 | Mattes .................. G01K 7/186 |
| | | 374/E7.023 |
| 2011/0039137 A1* | 2/2011 | Engle .................. H01M 10/486 |
| | | 429/90 |
| 2013/0004811 A1* | 1/2013 | Banerjee ................. G01K 7/16 |
| | | 374/185 |
| 2013/0260197 A1* | 10/2013 | Okada ............... H01M 10/6557 |
| | | 429/100 |
| 2016/0336762 A1* | 11/2016 | Hunter ................... H01M 10/46 |
| 2018/0062216 A1 | 3/2018 | Koch et al. |
| 2018/0062221 A1 | 3/2018 | Koch et al. |
| 2018/0062222 A1 | 3/2018 | Koch et al. |

* cited by examiner

*Primary Examiner* — Kenneth J Douyette
(74) *Attorney, Agent, or Firm* — Quinn IP Law

(57) ABSTRACT

A temperature sensor for a battery cell of a rechargeable battery is described, and includes a resistive sensing element, a first electrode, and a second electrode. The resistive sensing element, the first electrode, and the second electrode are affixed to a porous separator. The porous separator is interposed between an anode and a cathode of the battery cell. The resistive sensing element is electrically connected in series between the first electrode and the second electrode, and the resistive sensing element, the first electrode and the second electrode are affixed onto the separator as film layers, and are porous.

18 Claims, 3 Drawing Sheets

TEMPERATURE SENSOR

INTRODUCTION

Rechargeable batteries are employed on vehicles, power tools, stationary power systems, personal electronic devices, and other devices, and operate as portable electric energy storage devices. Characteristics related to energy charging, discharging, and life-cycle performance are affected by operating parameters including battery temperature. As such, there is benefit to accurately and precisely monitoring temperature of a rechargeable battery.

SUMMARY

The concepts described herein include a temperature sensor that is disposed in a battery cell of a rechargeable battery, which includes a resistive sensing element, a first electrode, and a second electrode, all of which are affixed to a porous separator that is interposed between an anode and a cathode of the rechargeable battery. The resistive sensing element is electrically connected in series between the first electrode and the second electrode, all of which are affixed onto the separator as film layers. The resistive sensing element, the first electrode and the second electrode are porous, and have permeabilities that are of the same order of magnitude as the permeability of the separator.

An aspect of the disclosure includes a temperature sensor for a battery cell of a rechargeable battery that includes a resistive sensing element, a first electrode, and a second electrode, wherein the resistive sensing element, the first electrode, and the second electrode are affixed to a porous separator. The porous separator is interposed between an anode and a cathode of the battery cell. The resistive sensing element is electrically connected in series between the first electrode and the second electrode, and the resistive sensing element, the first electrode and the second electrode are affixed onto the separator as film layers, and are porous.

Another aspect of the disclosure includes the resistive sensing element, the first electrode and the second electrode being fabricated from one of gold, nickel, or conductive carbon black material.

Another aspect of the disclosure includes the resistive sensing element, the first electrode and the second electrode having permeabilities that are a same order of magnitude as the permeability of the porous separator.

Another aspect of the disclosure includes a reference electrode being integrated into the resistive sensing element, wherein the reference electrode is affixed to the porous separator. The reference electrode is affixed onto the separator, and is porous.

Another aspect of the disclosure includes the reference electrode being integrated into the resistive sensing element, including the resistive sensing element including a first resistive path and a second resistive path. The first resistive path is electrically connected in parallel with the second resistive path, with the first resistive path being resistively symmetrical to the second resistive path. The reference electrode is connected to the first resistive path and to the second resistive path at a first junction. The first resistive path is electrically connected to the second resistive path at a second junction. The reference electrode includes a terminus portion that is disposed between the first and second resistive paths.

Another aspect of the disclosure includes the first resistive path being resistively symmetrical to the second resistive path by the first resistive path being a mirror image of the second resistive path.

Another aspect of the disclosure includes the first resistive path having the same geometric shape, cross-sectional area, and path length as the second resistive path.

Another aspect of the disclosure includes the reference electrode being porous, including the reference electrode having a permeability that is a same order of magnitude as the permeability of the porous separator.

Another aspect of the disclosure includes a temperature sensor that includes a resistive sensing element, a first electrode, a second electrode and a porous membrane, wherein the resistive sensing element, the first electrode, and the second electrode are affixed to the porous membrane, wherein the resistive sensing element is electrically connected in series between the first electrode and the second electrode, and the resistive sensing element, the first electrode and the second electrode each having a permeability that is a same order of magnitude as the permeability of the porous membrane.

Another aspect of the disclosure includes the resistive sensing element, the first electrode and the second electrode being affixed onto the separator as film layers.

Another aspect of the disclosure includes the resistive sensing element, the first electrode and the second electrode being fabricated from one of gold, nickel, or conductive carbon black material.

Another aspect of the disclosure includes a rechargeable battery cell that includes an anode, a cathode, a separator, a temperature sensor, a reference electrode, and a sensor shield. The separator is disposed between the anode and the cathode, and the temperature sensor is affixed to the separator. The sensor shield is disposed between the temperature sensor and an adjacent one of the anode or the cathode.

Another aspect of the disclosure includes the temperature sensor being affixed to the separator facing the anode, wherein the sensor shield is disposed between the temperature sensor and the anode.

Another aspect of the disclosure includes the temperature sensor being affixed to the separator facing the cathode, wherein the sensor shield is disposed between the temperature sensor and the cathode.

Another aspect of the disclosure includes the temperature sensor being a resistive sensing element that is electrically connected in series between a first electrode and a second electrode.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
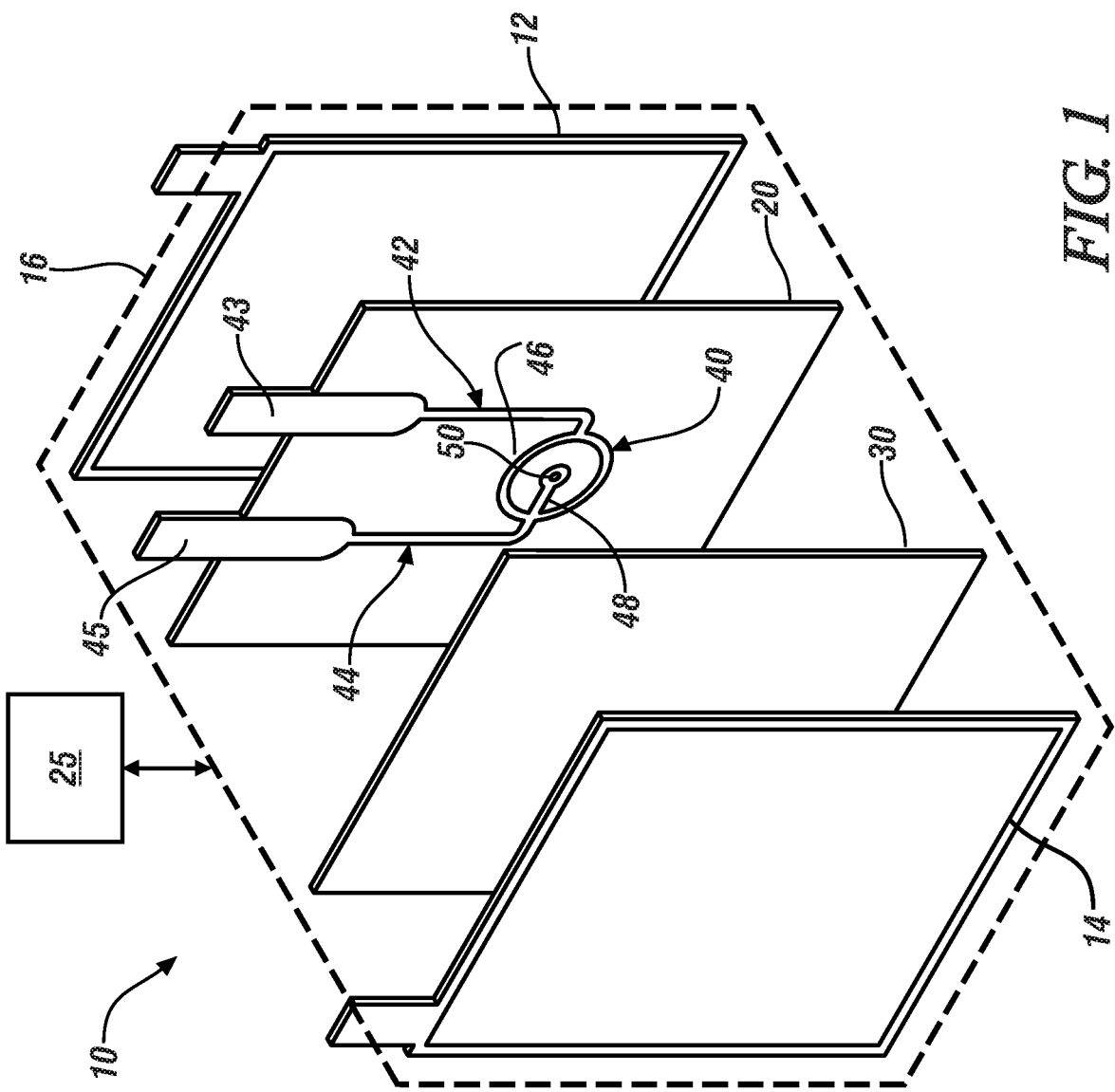
FIG. 1 schematically shows an exploded isometric view of a battery cell, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Furthermore, there is no intention to be bound by any expressed or implied theory presented in the preceding technical field, background, brief summary or the following detailed description. Furthermore, it should be understood that throughout the drawings, corresponding reference numerals indicate like or corresponding parts and features. The terms "first", "second" and the like are employed to distinguish like elements, and do not denote an order, quantity, priority or importance. The terms "a" and "an" and the like are employed to denote the presence of at least one of the referenced items, and do not denote a limitation of quantity.

Referring to the drawings, FIG. 1, consistent with embodiments disclosed herein, schematically illustrates a rechargeable battery cell 10 that may be an element of a battery pack or a battery system. The battery pack or battery system may include a plurality of the battery cells 10, and may be employed as an electric power source for a vehicle, a portable power tool, a personal electronic device, a computer system, a stationary device, and the like. In one embodiment, each of the battery cells 10 is configured as a lithium-ion electrochemical cell that is arranged to provide a particular voltage and/or current that is useful to power an electro-mechanical device such as an electric machine or actuator. Each of the battery cells 10 includes electrochemical materials, which may be in the form of an aqueous lithium ion solution containing electrolytes and/or electrode active materials that are responsible for electrical activity therein.

The battery cell 10 includes an anode 12, a cathode 14, a separator 20, a sensor shield 30, and a temperature sensor 40 enclosed within an enclosure 16 that contains electrochemical materials. As shown, and in one embodiment, the battery cell 10 is arranged as a large format pouch cell. The temperature sensor 40 is electrically connected to a reference electrode 48 in one embodiment. The separator 20 is disposed between and physically separates the anode 12 and the cathode 14. The temperature sensor 40 is affixed to the separator 20. The sensor shield 30 is disposed between the temperature sensor 40 and an adjacent one of the anode 12 or the cathode 14. In one embodiment, and as shown, the temperature sensor 40 is affixed to the separator 20 facing the anode 12, and the sensor shield 30 is disposed between the temperature sensor 40 and the anode 12. Alternatively, the temperature sensor 40 is affixed to the separator 20 facing the cathode 14, and the sensor shield 30 is disposed between the temperature sensor 40 and the cathode 14. In one embodiment, and as shown, the anode 12, cathode 14, separator 20, and sensor shield 30 are configured as planar devices that are arranged in parallel.

The separator 20 is a porous, permeable or semi-permeable composite membrane that includes a microporous substrate and a coating layer. The coating layer may be formed from a mixture of inorganic and/or organic particles and an aqueous or water-based polymeric binder. The coating layer may also be formed from filler material enabling or causing anisotropic electrical and/or thermal conduction. For example, the coating layer may include nanomaterials such as metallic, semi-metallic, or carbon-based nanoparticles, nanotubes, nanofibers, sheets or layers of graphene, or the like. Further, certain fillers may be used to provide enhanced structural characteristics. In addition to or in place of conductive fillers, structural fillers may be used, such as fibers, beads, granules, or the like, of a ceramic material, such a silicate or borosilicate glass, or another suitable material. The coating layer may also include porous material such as polyolefin (e.g., polyethylene, polypropylene), a polyarene (e.g., polystyrene, polyphenylene sulfide), or the like which permit lithium ions to pass through the coating layer.

The temperature sensor 40 is affixed to the separator 20, and includes a resistive sensing element 46, a first electrode 42 and a second electrode 44.

In one embodiment, the resistive sensing element 46, the first electrode 42 and the second electrode 44 are fabricated from gold. Alternatively, the resistive sensing element 46, the first electrode 42 and the second electrode 44 are fabricated from nickel, a conductive carbon black material, or another low reactivity platinum-group metal that is inactive in a lithium-ion chemistry. The resistive sensing element 46, the first electrode 42 and the second electrode 44 may be fabricated for any conductive material that can be rendered porous when affixed onto the separator 20 by sputtering or another deposition process and remains inactive in battery chemistry.

The resistive sensing element 46 is electrically connected in series between the first electrode 42 and the second electrode 44. First and second leads 43, 45, respectively, electrically connect to the first and second electrodes 42, 44, respectively, and provide electrical connections to a monitoring controller 25. The temperature sensor 40 is affixed to the separator 20 as a film layer by sputter-coating, or employing another form of physical vapor deposition. The affixation of the temperature sensor 40 as a film layer renders it porous and permeable to ion flow, thus avoiding disrupting lithium migration that includes the passing of liquid phase ion currents through the separator 20. The temperature sensor 40 is conductive and may be used to measure temperature within the battery cell 10. The measured temperature within the battery cell 10 may be extrapolated or otherwise employed to estimate temperature of a battery pack or a battery system in which the battery cell 10 is located.

Figure 2:
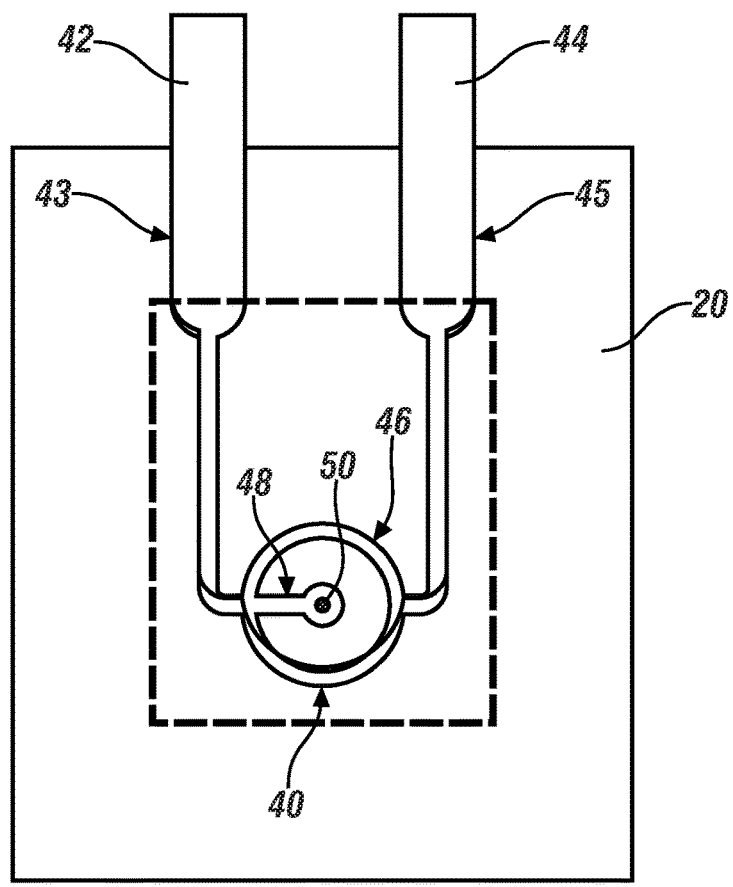
FIG. 2 schematically shows a plan view of a separator including a temperature sensor, in accordance with the disclosure.
Figure 3:
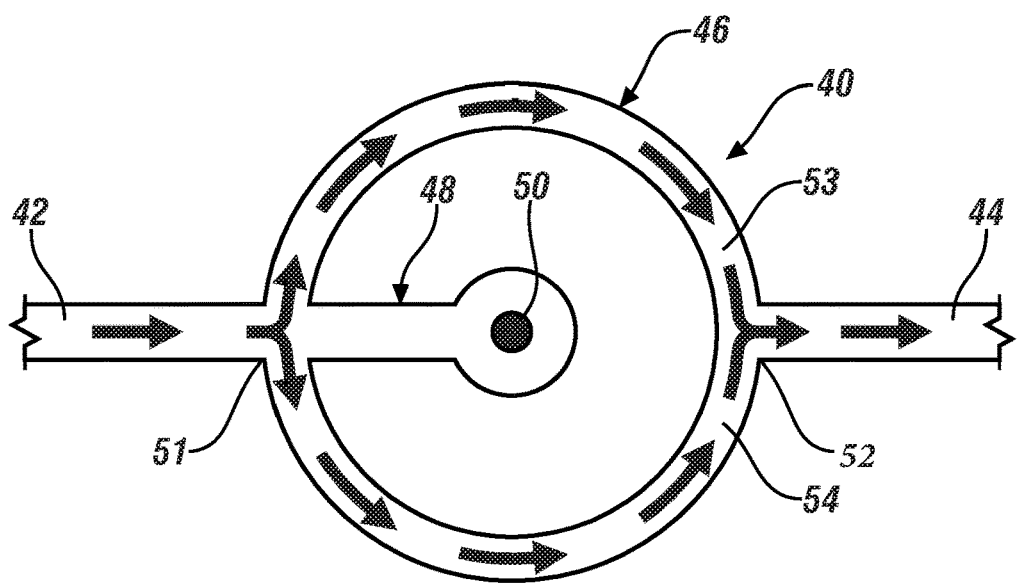
FIG. 3 schematically shows a plan view of a temperature sensor and reference electrode, in accordance with the disclosure.
Figure 4:
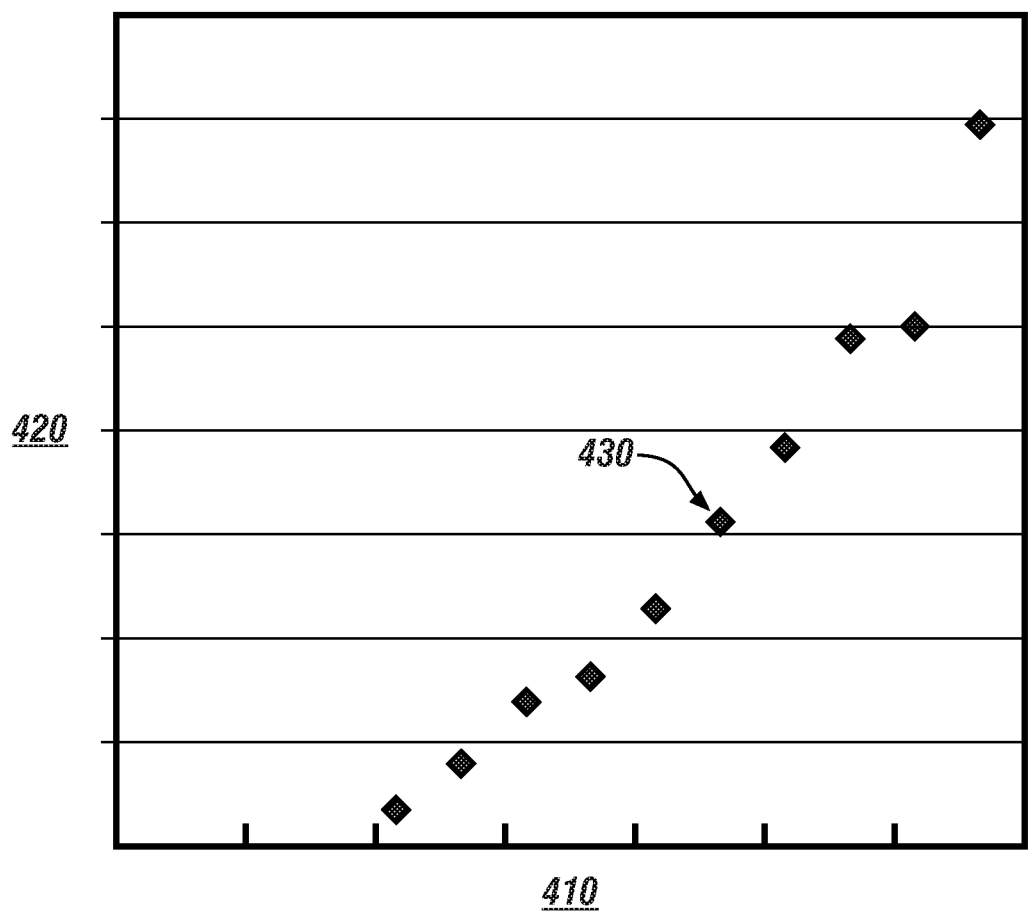
FIG. 4 graphically illustrates a calibration graph for an embodiment of a temperature sensor, in accordance with the disclosure.

Referring now to FIGS. 2 and 3, details related to the temperature sensor 40 affixed to the separator 20 are described. The temperature sensor 40 is a resistive temperature sensor, meaning that temperature is determined in relation to measured electrical resistance. FIG. 4 graphically shows an example of a calibration graph, which indicates temperature on the horizontal axis 410 and resistance on the vertical axis 420, with a temperature/resistance relationship 430 being shown. A linear regression can be determined, and reduced to practice as a calibration that may be implemented as a look-up table, an executable equation, or in another form in the monitoring controller 25 described with reference to FIG. 1. The monitoring controller 25 may execute a control routine to measure the electrical resistance in the temperature sensor 40, and determine temperature in the battery cell 10 based thereon.

Referring again to FIGS. 2 and 3, the temperature sensor 40 includes the resistive sensing element 46, the first electrode 42, and the second electrode 44. Resistance to the flow of electrical charge in an element, e.g., the resistive sensing element 46, the first electrode 42, and the second electrode 44 of the temperature sensor 40, can be determined in relation to a total length, cross-sectional area, and a material for the element in accordance with the following relationship:

$$R=\rho(L/A) \quad [1]$$

wherein:
R is the total resistance,
ρ is resistivity value of the material,
L is the length of the element, and
A is the cross-sectional area of the element.

The relationship described with reference to EQ. 1 may be employed to design the temperature sensor 40 so that the resistive contributions of the first and second electrodes 42, 44 provide minimal contributions to the overall resistance of the temperature sensor 40, with the resistive sensing element 46 being designed to control the temperature-based change in resistance of the temperature sensor 40. This information may be used to calibrate the temperature sensor 40, including selecting a desired path to adjust sensitivity to temperature change.

The first electrode 42 and the second electrode 44 may be arranged in thin layers with relatively wide surface areas to minimize resistance and enhance permeability. The permeabilities of the first and second electrodes 42, 44 are of the same order of magnitude as the permeability of the separator 20, thus not interfering with the lithium migration function of the separator 20. In one embodiment, the elements of the temperature sensor 40 are an order of magnitude thinner than other layers of the battery cell 10. In one embodiment, the temperature sensor 40 is fabricated as a thin film temperature sensor that is 50 nm thick. The thin film has a low heat capacity, allowing it to respond quickly to temperature changes, including temperature changes caused by electrochemical activity. The use of sputter coating allows the temperature sensor 40 to be as porous and as permeable as the separator 20, thus militating against interference with ion current flow, and provides a conductor for the reference electrode 48. The temperature sensor works as a thermistor, with an increased resistance being associated with an increased temperature. Total resistance is measured as a function of temperature and geometry of sputter deposition of the temperature sensor 40. Small cross-section areas with long path lengths dominate resistance, so resistance of the overall system is approximately equal to resistance of intentionally designed thin areas, which are associated with the resistive sensing element 46. Thus, temperature is measured at the thin areas of the temperature sensor 40, i.e., at the resistive sensing element 46. The resistive sensing element 46 may be affixed to the separator 20 at a desired location for monitoring temperature at the desired location in the battery cell 10. In one embodiment, the desired location may be near a geometric center of the planar area associated with the separator 20. In one embodiment, the desired location may be near a bottom portion of the planar area associated with the separator 20. In one embodiment, the desired location may be near a top portion of the planar area associated with the separator 20.

Design factors such as location of the battery pack in relation to the system employing the battery pack and associated heat transfer may influence location of the temperature sensor 40. Furthermore, the temperature sensor 40 may be disposed in one or a portion of the battery cells in a battery pack, and factors associated with heat transfer in the battery pack may influence location of battery cell 10 that contains the temperature sensor 40.

Referring now to FIG. 3, additional details related to the temperature sensor 40 including the first and second electrodes 42, 44 and the reference electrode 48 are described. The reference electrode 48 is integrated into the resistive sensing element 46 of the temperature sensor 40. The resistive sensing element 46 includes a first resistive path 53 and a second resistive path 54, wherein the first resistive path 53 is electrically connected in parallel with the second resistive path 54, wherein current flow therethrough is depicted by arrows. The reference electrode 48 is connected to the first resistive path 53 and to the second resistive path 54 at a first junction 51. Furthermore, the first resistive path 53 is electrically connected to the second resistive path 54 at a second junction 52. The reference electrode 48 projects between the first and second resistive paths 53, 54, and includes a terminus portion 50 that is disposed between the first and second resistive paths 53, 54.

The first and second resistive paths 53, 54 are designed to have resistive symmetry, which means that the resistances of the first and second resistive paths 53, 54 are equivalent. In one embodiment, the first resistive path 53 has resistive symmetry with the second resistive path 54 by having the first resistive path 53 arranged as a mirror image of the second resistive path 54. This includes the first resistive path 53 having the same geometric shape, cross-sectional shape including area and thickness, and path length as the second resistive path 54, and the first resistive path 53 being fabricated from the same material as the second resistive path 54. The resistive symmetry and associated symmetrical arrangement of the first and second resistive paths 53, 54 are exploited to minimize electrical current through reference electrode 48 when the controller 45 is operating to measure resistance and thus determine temperature.

The thin film temperature sensor and reference electrode described herein may be used within a cell stack in a large format commercial cell or a small format laboratory setup. The temperature sensor 40 serves a dual purpose of providing a reference electrode and a thermistor, with the separator being used as support substrate. Thickness, path length, and path width of the porous thermistor may be varied in different applications to alter resistive sensitivity to temperature changes in different regions of the separator. The symmetry minimizes variations in electrical currents near the reference electrode when temperature measurements are occurring.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A temperature sensor for a battery cell of a rechargeable battery, comprising:
   a resistive sensing element, a first electrode, a second electrode, and a reference electrode;
   wherein the resistive sensing element, the first electrode, the second electrode, and the reference electrode are affixed to a porous separator;
   wherein the porous separator is interposed between an anode and a cathode of the battery cell;
   wherein the resistive sensing element is electrically connected in series between the first electrode and the second electrode;
   wherein the resistive sensing element, the first electrode the second electrode, and the reference electrode are affixed onto the separator by physical vapor deposition; and
   wherein the resistive sensing element, the first electrode the second electrode, and the reference electrode are porous.

2. The temperature sensor of claim 1, wherein the resistive sensing element, the first electrode and the second electrode are fabricated from one of gold, nickel, or conductive carbon black material.

3. The temperature sensor of claim 1, wherein the resistive sensing element, the first electrode and the second electrode being porous comprises the resistive sensing element, the first electrode and the second electrode having permeabilities that are a same order of magnitude as the permeability of the porous separator.

4. The temperature sensor of claim 1, wherein the reference electrode being integrated into the resistive sensing element comprises:
   the resistive sensing element including a first resistive path and a second resistive path;
   wherein the first resistive path is electrically connected in parallel with the second resistive path;
   wherein the first resistive path is resistively symmetrical to the second resistive path;
   wherein the reference electrode is connected to the first resistive path and to the second resistive path at a first junction;
   wherein the first resistive path is electrically connected to the second resistive path at a second junction; and
   wherein the reference electrode includes a terminus portion that is disposed between the first and second resistive paths.

5. The temperature sensor of claim 4, wherein the first resistive path being resistively symmetrical to the second resistive path comprises the first resistive path being a mirror image of the second resistive path.

6. The temperature sensor of claim 5, wherein the first resistive path being a mirror image of the second resistive path comprises the first resistive path having the same geometric shape, cross-sectional area, and path length as the second resistive path.

7. The temperature sensor of claim 1, wherein the reference electrode being porous comprises the reference electrode having a permeability that is a same order of magnitude as the permeability of the porous separator.

8. A temperature sensor, comprising:
a resistive sensing element, a first electrode, a second electrode, a reference electrode, and a porous membrane;
wherein the resistive sensing element, the first electrode, the second electrode, and the reference electrode are affixed to the porous membrane;
wherein the resistive sensing element is electrically connected in series between the first electrode and the second electrode; and
wherein the resistive sensing element, the first electrode and the second electrode each has a permeability that is a same order of magnitude as the permeability of the porous membrane.

9. The temperature sensor of claim 8, wherein the resistive sensing element, the first electrode, and the second electrode being affixed to the porous membrane comprise the resistive sensing element, the first electrode and the second electrode being sputter-coated onto the porous membrane.

10. The temperature sensor of claim 8, further comprising the resistive sensing element, the first electrode and the second electrode being fabricated from one of gold, nickel, or conductive carbon black material.

11. A rechargeable battery cell, comprising:
an anode, a cathode, a separator, a temperature sensor, a reference electrode, and a sensor shield;
wherein the separator is disposed between the anode and the cathode;
wherein the temperature sensor is affixed to the separator;
wherein the reference electrode is electrically connected to the temperature sensor;
wherein the sensor shield is disposed between the temperature sensor and an adjacent one of the anode or the cathode;
wherein the temperature sensor includes a resistive sensing element, a first electrode, and a second electrode;
wherein the resistive sensing element, the first electrode, the second electrode, and the reference electrode are affixed to the separator;
wherein the resistive sensing element is electrically connected in series between the first electrode and the second electrode;
wherein the resistive sensing element, the first electrode the second electrode, and the reference electrode are affixed onto the separator by physical vapor deposition; and
wherein the resistive sensing element, the first electrode, the second electrode, and the reference electrode are porous.

12. The rechargeable battery cell of claim 11, wherein the temperature sensor is affixed to the separator facing the anode; and
wherein the sensor shield is disposed between the temperature sensor and the anode.

13. The rechargeable battery cell of claim 11, wherein the temperature sensor is affixed to the separator facing the cathode; and
wherein the sensor shield is disposed between the temperature sensor and the cathode.

14. The rechargeable battery cell of claim 11, wherein the temperature sensor comprises a resistive sensing element electrically connected in series between a first electrode and a second electrode.

15. The rechargeable battery cell of claim 14, wherein the resistive sensing element, the first electrode and the second electrode are fabricated from gold.

16. The rechargeable battery cell of claim 14, wherein the resistive sensing element, the first electrode and the second electrode are affixed onto the separator as film layers.

17. The rechargeable battery cell of claim 14, wherein the reference electrode being electrically connected to the temperature sensor comprises the reference electrode being electrically integrated into the resistive sensing element.

18. The rechargeable battery cell of claim 14, wherein the resistive sensing element includes the reference electrode being electrically connected to a first resistive path and to a second resistive path at a first junction;
wherein the first resistive path is electrically connected to the second resistive path at a second junction;
wherein the first resistive path is electrically connected in parallel with the second resistive path;
wherein the reference electrode includes a terminus portion that is disposed between the first and second resistive paths; and
wherein the first resistive path is resistively symmetrical to the second resistive path.

* * * * *